United States Patent Office 2,965,592
Patented Dec. 20, 1960

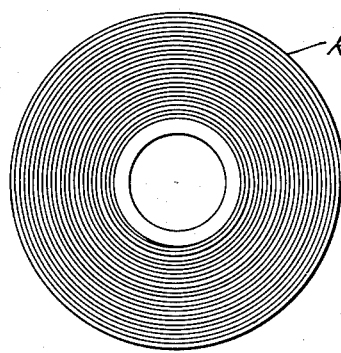
Roll of pressure-sensitive adhesive tape.
Flexible backing.
Pressure-sensitive adhesive formed of a blend of polyvinyl alkyl ether and terpene phenolic resin.
INVENTORS
DOLORES O. ETHIER
ROLAND A. AUGER
BY
Carpenter, Abbott, Coulter & Kinney
ATTORNEYS

2,965,592

PRESSURE-SENSITIVE TAPE ADHESIVES

Dolores O. Ethier and Roland A. Auger, White Bear Lake, Minn., assignors to Minnesota Mining and Manufacturing Company, St. Paul, Minn., a corporation of Delaware Filed Mar. 10, 1958, Ser. No. 720,504

7 Claims. (Cl. 260—27)

This present application is a continuation-in-part of our copending application Serial No. 573,937 filed March 26, 1956, now abandoned.

This invention relates to normally tacky and pressure-sensitive adhesives and to adhesive tapes made therefrom. In particular the invention relates to adhesive tapes having flexible backings coated with age-resistant pressure-sensitive adhesive based on certain combinations of polymers of vinyl alkyl ethers and phenolic resins.

Normally tacky and pressure-sensitive adhesive tapes are widely used for a variety of sealing, holding, fastening, mending and masking purposes. Typical adhesive formulas contain natural or synthetic rubber and a tackifier resin such as a modified rosin or one of various hydrocarbon resins. Polymers or copolymers of certain acrylate monomers, polymers of vinyl alkyl ethers, etc., and mixtures, which are inherently normally tacky, have also been used. These adhesives are aggressively tacky in their normal dry state and adhere to most surfaces on mere contact therewith.

Most pressure-sensitive tape adhesives are subject to deterioration in normal use, particularly when exposed to direct sunlight or elevated temperatures. In a typical case, the adhesive will gradually soften and weaken so that the tape cannot be unwound from a roll or removed from a hard, nonporous surface without undergoing delamination, and if applied to paper or other porous surface, the adhesive will penetrate the surface to leave an oil-like blot. Such penetration will normally render paper transparent, i.e., transparentize the paper.

Of the above-mentioned pressure-sensitive adhesive formulations, rubber-resin adhesives have been found to be the most susceptible to aging while acrylates have provided to be the most stable in the present state of the art. However, rubber-resin adhesives are widely used commercially because of their great strength and relative economy. Where a high degree of permanence is required as in the mending of books, acrylate-based adhesives have been preferred, and since their deterioration is almost imperceptible, they are referred to as permanent adhesives. Because adhesives based on vinyl alkyl ether polymers have been inferior to the acrylate types in point of aging, their use has heretofore been limited.

Surprisingly, a class of resins, which when combined with natural rubber to produce rubber-resin adhesives does not (even though protected with an antioxidant) provide stability approaching that of preferred rubber-resin pressure-sensitive adhesive, has now been found which both tackifies and stabilizes vinyl alkyl ether polymers to provide pressure-sensitive adhesives having unusually good resistance to the effects of sunlight and heat, and it has also been discovered that such adhesive compositions can be rendered even more age-resistant by inclusion of conventional antioxidants. These adhesives have a combination of adhesion, cohesion, stretchiness and elasticity, which permits of unwinding of tape from rolls and removing from smooth surfaces, and of handling with the fingers, without offsetting or delamination of adhesive. The novel class of tackifier-stabilizers employed in combination with vinyl alkyl ether polymers consists of compatible, non-heat-advancing terpene phenolic resins selected from the group consisting of wood rosin substituted phenol and pinene substituted phenol.

The invention will now be further illustrated by the following examples, in which all parts are by weight, without intent to be limited thereto.

Example 1

| | Parts by weight |
|---|---|
| Polyvinyl n-butyl ether | 100 |
| Terpene phenolic resin | 15 |
| Antioxidant | 1.5 |
| Heptane | 800 |

The vinyl polymer used in this example has an inherent viscosity of about 8 as calculated in the usual way from the viscosities of dilute solutions in benzene solvent as measured on the Ostwald viscometer. The terpene phenolic resin is a commercial resin sold by Newport Industries, Inc. under the trade name "Newport S" and is believed to consist of the condensation product of a Friedel-Crafts type reaction between phenol and alpha- and beta-pinene and to comprise about 20–25 percent phenol by weight. This resin is non-heat-advancing, is compatible with vinyl alkyl ether polymers, and has a softening point, as measured by the ball and ring method, of about 115° C. The antioxidant is "Antioxidant 2246," a product of the American Cyanamid Co. and is stated by the manufacturer to be 2,2'-methylene bis-(4-methyl, 6-tert-butyl phenol).

This solution was coated on 600 gauge untreated cellophane film over a primer layer of polyvinyl alcohol in GR–S latex and dried at 150° F. in an air-circulating oven for 15 minutes to leave a transparent pressure-sensitive adhesive coating having a dry weight of about 6.5 to 7 grains per 24 square inches. The cellophane was slit into half inch widths and wound upon itself in rolls for convenient storage.

After ordinary storage in roll form for about 18 to 24 months, the tape was readily unwound without delamination and was found to be substantially as tacky and capable of forming substantially as strong a bond as was the tape prior to storage.

As another test of the aging characteristics of this transparent pressure-sensitive adhesive tape, strips of the freshly-prepared tape were rolled into full contact with unglazed sulfate paper commonly used for writing with ink and then placed in a dust-proof cabinet and exposed continuously to illumination, directed essentially vertically at the exposed transparent backing, from a General Electric "RS" sunlamp at a distance of 30 inches. The intensity of the lamp was controlled to provide 13.2 erythemal units at a distance of 12 inches from the lamp. The temperature at the paper was maintained within five degrees of 120° F. Upon periodic examination, the paper first showed signs of transparency due to penetration by the adhesive after 20 days under the sunlamp.

Simultaneously tested for simulated sunlight aging was a pressure-sensitive adhesive tape identical to the above-described tape except for substitution of the terpene phenolic resin by a polymerized beta-pinene resin which melts at 115° C., has a zero acid number and is known as "Piccolyte S–115." Although it is believed that this resin is the longest-aging tackifier presently available for rubber-resin adhesives, penetration of the paper occurred after only 5 days.

Tapes in which the terpene phenolic resin was replaced by ester gum, a commonly used tackifier for vinyl ether adhesives, instead of "Piccolyte," produced penetration after 4 days.

It should be noted that the ability to resist this or equivalent simulated sunlight aging for a period of more than 30 hours without observable penetration of the paper by adhesive is considered by the industry to be indicative of satisfactory sunlight aging for ordinary pressure-sensitive adhesive tapes.

*Example II*

| | Parts by weight |
|---|---|
| Polyvinyl ethyl ether (3.2 inherent viscosity) | 100 |
| Polyvinyl ethyl ether (0.3 inherent viscosity) | 10 |
| Terpene phenolic resin | 10 |
| Ethanol | 500 |

The polyvinyl ethyl ether of 0.3 inherent viscosity was included as a plasticizer-tackifier to obtain a softer adhesive. The terpene phenolic resin was that used in the preceding example, i.e., "Newport S."

A pressure-sensitive adhesive of the above-formulation prepared and coated out on cellophane following the procedure outlined in the preceding example showed no sign of penetration of unglazed sulfate paper until 14 days under the sunlamp at the described conditions.

Tape including an additional two parts of the antioxidant di-tert-amyl hydroquinone, i.e., "Santovar A," resisted softening to the point of penetrating the paper for 15 days under the sunlamp.

In contrast, tape prepared with this antioxidant but without terpene phenolic resin showed penetration after 9 days.

Another pressure-sensitive adhesive tape was prepared following the procedure outlined in Example I and using the formulation of Example II except that the terpene phenolic resin was replaced by 15 parts of "Bakelite BR-14634" as the stabilizer-tackifier resin, which resin is an oil-soluble, heat-advancing phenol-aldehyde resin compatible with the vinyl ether polymer. While this tape is well suited for long-term mending use in view of its ability to remain strongly bonded to paper for indefinite periods without transparentizing paper when exposed to conditions as in the above-described sunlamp aging test, it is not adapted to extended storage in roll form. Rolls of this tape experienced excessive loss of tackiness upon storage under ordinary conditions for about 18 to 24 months. In contract, the tape of Example II prepared with the non-heat-advancing terpene phenolic resin suffered substantially no loss in tackiness when stored for such period under the same conditions.

*Example III*

| | Parts by weight |
|---|---|
| Polyvinyl ethyl ether | 100 |
| Terpene phenolic resin | 15 |
| Antioxidant | 2 |
| Ethanol | 10 |
| Heptane | 600 |

The polyvinyl ethyl ether used in this example had an inherent viscosity of about 3.2. The terpene phenolic resin was produced by heating in the presence of a small amount of boron trifluoride a mixture of approximately equal parts of phenol and N wood rosin, a product of the Hercules Powder Company. The reaction product, a rosin substituted phenol, is believed to contain about 40 percent by weight of phenol. It is a non-heat-advancing resin, is compatible with vinyl alkyl ether polymer, and has a ball and ring softening point of about 105° C. Used as the antioxidant was di-tert-amyl hydroquinone.

A pressure-sensitive adhesive of this formulation prepared and coated on 600 gauge primed cellophane as described in Example I was subjected to simulated sunlight aging as described in that example. Penetration was first observed after 13 days under the sunlamp.

When N wood rosin was substituted for the terpene phenolic resin, the adhesive began to penetrate the paper after 6 days.

The normally tacky and pressure-sensitive adhesives of the foregoing examples and of this invention are eucohesive; that is, they are more cohesive than adhesive, but still tacky. Hence the coated adhesive tape product can be unwound from roll form, handled with the fingers, and stripped from smooth surfaces without leaving adhesive residue or gumming the fingers.

In preparing the adhesive tape or coated adhesive sheet materials of this invention, any of the commonly employed flexible backings and any of the adhesive priming coatings, backsizings, and the like, may be utilized as will be appreciated by those skilled in the adhesive tape art. Likewise pigments and other modifiers may be added to the adhesive compositions where opacity, color, increased firmness, or other effects are desired.

In addition to the specific polymers of vinyl alkyl ether previously listed, a number of other polymers and copolymers have been found to provide pressure-sensitive adhesives having excellent aging properties when formulated as taught by this invention. For example, copolymers of vinyl n-butyl ether and higher homologues such as vinyl n-amyl ether and vinyl-n-octyl ether have been admixed with the unreacted compatible phenol-containing resins in the production of long aging pressure-sensitive adhesives. Useful pressure-sensitive adhesive tapes have also been produced in the practice of this invention using a homopolymer of vinyl n-octyl ether having an inherent viscosity of about 3.4. However, in the present state of the art, it is difficult to polymerize vinyl ethers having chains of more than eight carbon atoms to provide compositions of sufficient firmness to function as eucohesive adhesives. Particularly useful are polymers and copolymers of non-tertiary vinyl alkyl ethers, a major proportion of the alkyl chains of which have about four carbon atoms, e.g., the polymer of vinyl n-butyl ether.

Vinyl alkyl ether polymers having inherent viscosities varying from 3.2 to about 15 have been shown to provide long-aging adhesives of good quality in the practice of this invention. Adhesives produced from polyvinyl alkyl ethers within this range of viscosities possess the fourfold balance of adhesion, cohesion, stretchiness and elasticity required of pressure-sensitive adhesives. Vinyl alkyl ether polymers of more than about 15 inherent viscosity are difficult to prepare in the present state of the art and so are not preferred in the practice of this invention. Pressure-sensitive adhesive compositions of commercial quality can be prepared from any solid vinyl alkyl ether polymers including those of less than 3.2 inherent viscosity, although the use of such polymers makes the compounding of adhesive compositions somewhat more difficult but within the ability of one skilled in the art. The incorporation of various other modifiers in the novel adhesive compositions including other tackifiers and plasticizers is not precluded and would be expected to enhance certain qualities of the product.

Pressure-sensitive adhesive tapes have been prepared in accordance with this invention using from 2 to 40 parts of terpene-phenolic resin to 100 parts by weight of vinyl alkyl ether polymer. When the novel adhesives contain less than about 10 parts of the terpene phenolic resin per 100 parts of vinyl alkyl ether polymer, improvement in sunlight aging is less apparent, while the use of more than about 30 parts of the resin tends to make the adhesives somewhat harsh.

Because the novel adhesive compositions retain excellent pressure-sensitive qualities at elevated temperatures and have excellent resistance to the effects of sunlight, they are ably suited for long-term mending of papers and books or for application to surfaces such as glass windows where they may be exposed to direct sunlight.

The attached drawing shows a roll of pressure-sensitive adhesive tape wound directly upon itself. The tape is provided with a normally tacky and pressure-sensitive adhesive coating of a blend of polyvinyl alkyl ether and terpene phenolic resin. The tape is wound so that the adhesive side is on the inside.

What is claimed is:

1. Permanently tacky and pressure-sensitive tape adhesive composition comprising a blend of (1) 100 parts by weight of solid polymeric vinyl alkyl ether having side chains of at least two and up to about eight carbon atoms and (2) about 2–40 parts of compatible non-heat-advancing terpene phenolic resin selected from the group consisting of wood rosin substituted phenol and pinene substituted phenol.

2. Permanently tacky and pressure-sensitive tape adhesive composition comprising a blend of (1) 100 parts by weight of polymeric vinyl alkyl ether of at least about 3.2 inherent viscosity and having side chains of at least two and up to about eight carbon atoms, (2) about 10–30 parts of compatible non-heat-advancing terpene phenolic resin selected from the group consisting of wood rosin substituted phenol and pinene substituted phenol, and (3) up to about 3 parts of an antioxidant.

3. Pressure-sensitive adhesive as defined in claim 1 wherein the terpene phenolic resin is a condensation product of pinene and phenol.

4. Pressure-sensitive adhesive as defined in claim 1 wherein the terpene phenolic resin is N-wood a rosin substituted phenol.

5. Pressure-sensitive adhesive as defined in claim 1 wherein the polymeric vinyl alkyl ether is polyvinyl ethyl ether.

6. Pressure-sensitive adhesive as defined in claim 1 wherein a major proportion of the alkyl chains of the polymeric vinyl alkyl ether have about four carbon atoms.

7. Permanently tacky and pressure-sensitive adhesive tape comprising a flexible backing member carrying a coating of an adhesive according to claim 1.

References Cited in the file of this patent

UNITED STATES PATENTS

| | | |
|---|---|---|
| 2,596,235 | Geiger | May 13, 1952 |
| 2,601,016 | Hendricks | June 17, 1952 |

FOREIGN PATENTS

| | | |
|---|---|---|
| 644,291 | Great Britain | Oct. 11, 1950 |
| 722,805 | Great Britain | Feb. 2, 1955 |

UNITED STATES PATENT OFFICE
CERTIFICATION OF CORRECTION

Patent No. 2,965,592                              December 20, 1960

Dolores O. Ethier et al.

It is hereby certified that error appears in the above numbered patent requiring correction and that the said Letters Patent should read as corrected below.

Column 1, line 50, for "provided" read -- proved --; column 3, line 48, for "contract" read -- contrast --; column 6, line 5, for "N-wood a" read -- a N-wood --.

Signed and sealed this 23rd day of May 1961.

(SEAL)
Attest:

ERNEST W. SWIDER                                 DAVID L. LADD
Attesting Officer                                      Commissioner of Patents